United States Patent [19]

Obata

[11] Patent Number: 4,807,091

[45] Date of Patent: Feb. 21, 1989

[54] ILLUMINATING DEVICE FOR AN ELECTRIC PART

[75] Inventor: Kosei Obata, Miyagi, Japan

[73] Assignee: Alps Electric Co., Ltd., Japan

[21] Appl. No.: 187,826

[22] Filed: Apr. 29, 1988

[30] Foreign Application Priority Data

May 19, 1987 [JP] Japan ............................ 61-73600[U]

[51] Int. Cl.$^4$ ............................................ G01D 11/28

[52] U.S. Cl. ........................................ 362/30; 362/26; 362/29; 116/286

[58] Field of Search ....................... 362/23, 26, 29, 30; 116/286, 287, 288

[56] References Cited

U.S. PATENT DOCUMENTS

| | | | |
|---|---|---|---|
| 2,885,992 | 5/1959 | Roberts et al. . | |
| 3,574,993 | 4/1971 | Black | 362/30 X |
| 4,573,106 | 2/1986 | Kuratani | 362/30 X |

*Primary Examiner*—Stephen F. Husar

*Attorney, Agent, or Firm*—Guy W. Shoup; Paul J. Winters

[57] ABSTRACT

An illuminating device for an electric part which can illuminate a light conducting member uniformly with a simple construction. The illuminating device comprises an annular filter having a light passing zone and a light absorbing zone formed at different circumferential portions thereof. The filter is located on a lower face of and positionable in a circumferential direction relative to a cylindrical light conducting member which surrounds a manually operable knob mounted for rotation relative to an operation panel. A light source is located below the light conducting member so that light emitted from the light source is transmitted to an upper end face of the operation panel by way of the filter and the light conducting member. The distribution of the light passing zone and the light absorbing zone of the filter is selected suitably so as to attain desired uniform illumination at the upper end face of the operation panel.

8 Claims, 2 Drawing Sheets

ILLUMINATING DEVICE FOR AN ELECTRIC PART

BACKGROUND OF THE INVENTION

This invention relates to an illuminating device for an electric part of the manually rotatable type such as a rotary switch.

An illuminating device for an electric part wherein a light source is located inside an operation panel and emits light to illuminate a light conducting member located around a knob is used, for example, for a carcarried electric part.

Preferably, an illuminating device for an electric part of the type mentioned is designed such that an entire face of a light conducting member is illuminated uniformly by the light from a light source. Appearance of a portion of an illuminated face of a light conducting member which is far lighter or far darker than the other portion must be avoided because it will make it difficult to read an indication on or around the light conducting member.

By the way, most of electric parts in which such an illuminating device as described above is incorporated are of such a construction that an operation shaft is located at the center of a knob as, for example, in a rotary switch. Since an electric part of the type just mentioned cannot have a light source located at the center of a knob, commonly a light source is mounted at a location displaced from an axis of the knob. Accordingly, there is a problem that an indicating portion of the electric part is not illuminated uniformly because the distance from a light source varies at different portions of a light conducting member.

To eliminate this, another illuminating device for an electric part has been proposed wherein a light reflecting paint is applied to a face of a wall of a particular member which surrounds a light conducting member such as a support member for supporting a light source thereon so that light reflected by the wall face may be transmitted to a portion of the light conducting member remote from the light source. However, while uniform illumination can be attained better than illumination by an illuminating device which does not use a light reflecting paint, the illuminating device still has a problem that a sufficient effect cannot be attained because it is difficult to control the reflected light. It is also a problem that, since it is necessary to assure light paths from the light source to the reflecting face and the light conducting member, the degree of freedom in designing is lowered and the device has a relatively large overall size.

SUMMARY OF THE INVENTION

Accordingly, it is an object of the present invention to provide an illuminating device for an electric part which can illuminate a light conducting member uniformly with a simple construction.

In order to attain the object, according to the present invention, there is provided an illuminating device for an electric part which comprises an operation panel, a knob mounted for manual rotation relative to the operation panel, a cylindrical light conducting member located around the knob, a light source located below the light conducting member, the light conducting member transmitting light emitted from the light source to an upper face of the operation panel, and an annular filter located on a lower face of the light conducting member and having thereon a positioning means for positioning the filter in a circumferential direction relative to the light conducting member, the filter having a light passing zone and a light absorbing zone formed at different circumferential portions thereof.

With the illuminating device for an electric part of the present invention, since the annular filter is located on the lower face of the cylindrical light conducting member and positioned in the circumferential direction with respect ot the light conducting member, light emitted from the light source is transmitted to the upper end of the light conducting member via the filter. Here, since the filter has the light passing zone and the light absorbing zone thereon, the upper end face of the light conducting member can be illuminated uniformly if the distribution of the light passing zone and the light absorbing zone of the filter is selected suitably with the distance from the light source taken into consideration.

Thus, according to the present invention, an illuminating device for an electric part can be realized wherein the rate of light to be transmitted from a light source to a light conducting member can be changed locally by means of a filter which can be positioned readily and with certainty relative to the light source and accordingly an area around a knob can be illuminated with a uniform brightness irrespective of the location of the light source.

The above and other objects, features and advantages of the present invention will become apparent from the following description and the appended claims, taken in conjunction with the accompanying drawings.

DETAILED DESCRIPTION OF THE PREFERRED EMBODIMENT

Figure 1:
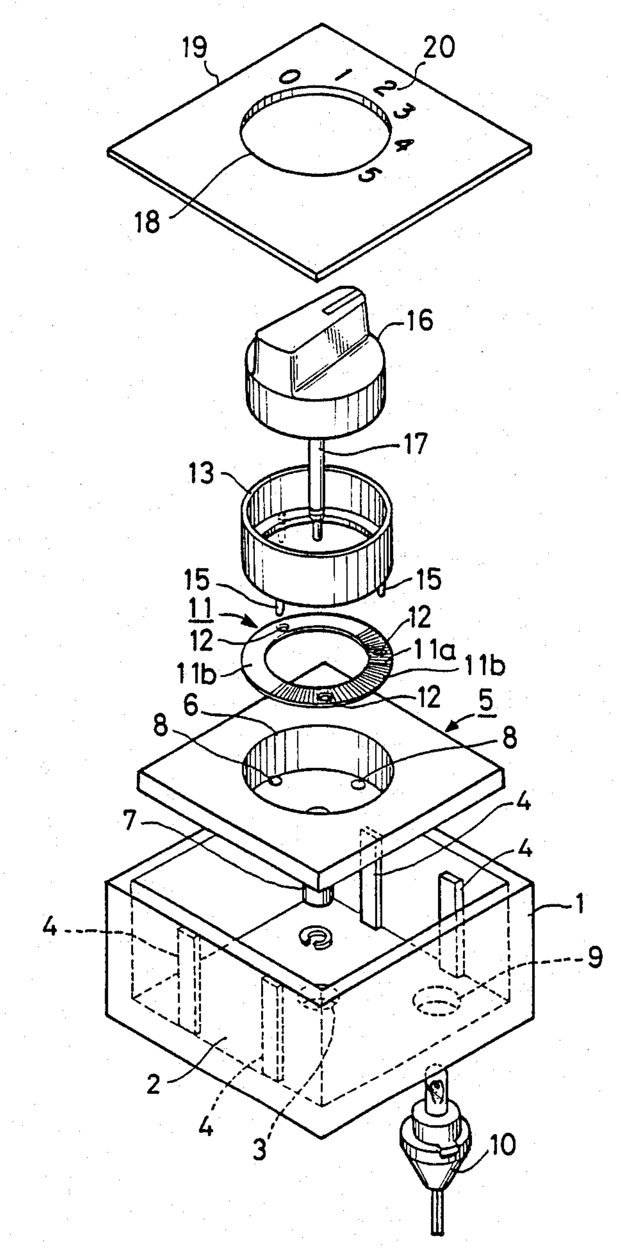
FIG. 1 is a fragmentary perspective view of an illuminating device for an electric part showing a preferring embodiment of the present invention.
Figure 2:
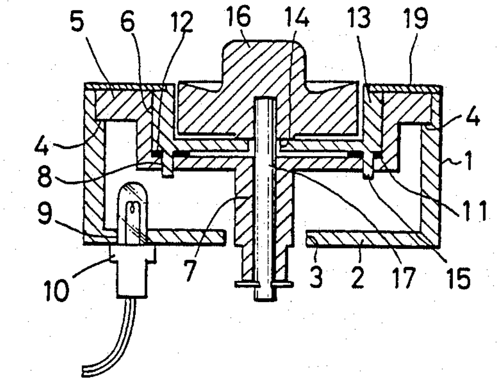
FIG. 2 is an axial sectional view of the illuminating device of FIG. 1.
Figure 3:
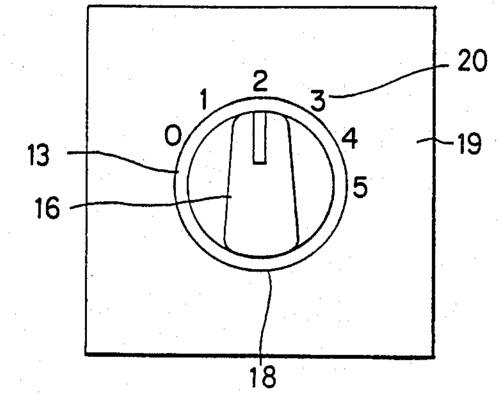
FIG. 3 is a plan view of the illuminating device of FIG. 1.

Referring to FIGS. 1 to 3, an illuminating device for an electric part according to the present invention is shown. The illuminating device shown includes a casing 1 in the form of a tubular parallelepiped with its top opened. A fitting hole 3 is formed at the center of a bottom wall 2 of the casing 1, and a plurality of ribs 4 are formed on inner faces of a pair of opposing peripheral walls of the casing 1 and extend in parallel vertical directions. A support plate 5 is placed on top ends of the ribs 4 so as to close the top opening of the casing 1. The support plate 5 is made of a transparent or translucent synthetic resin material and has a size a little smaller than the top opening of the casing 1. The support plate 5 has a circular recess 6 formed at the center thereof. A cylindrical fitting shaft 7 is provided downwardly at the center of a bottom wall of the recess 6 of the support plate 5, and up to 3 positioning holes 8 are formed at locations of the bottom wall of the recess 6 outwardly of the fitting shaft 7 in an equidistantly spaced relationship by an angle of about 120 degrees in a circumferential direction. The fitting shaft 7 of the support plate 5 extends downwardly through and is exposed outside from the hole 3 perforated at the center of the bottom wall 2 of the casing 1. A mounting hole 9 is formed at a corner portion of the bottom wall 2 of the casing 1, and a lamp 10 serving as a light source is securely mounted in the mounting hole 9.

The illuminating device further includes a filter 11 in the form of an annular ring formed from a synthetic resin film. The filter 11 has up to 3 positioning holes 12 formed therein in an equidistantly spaced relationship by an angle of about 120 degrees in a circumferential direction. A light absorbing zone. including a large number of light absorbing portions 11*a* is formed on about one circumferential half of the filter 11 by printing strips on a face of the filter 1 with a color paint while a light passing zone is provided on the remaining circumferential half of the filter 11 and each of the remaining half and portions between adjacent strips of the filter 11 constitutes a light passing portions 11*b*. The filter 11 is arranged in the recess 6 of the support plate 5 such that the light absorbing portions 11*a* thereof may oppose to the lamp 10 with the positioning holes 12 thereof held in register with the positioning holes 8 of the support plate 5.

The illuminating device further includes a cylindrical light conducting member 13 made of a transparent or translucent material such as an acrylic resin. A fitting hole 14 is perforated at the center of the light conducting member 13, and up to 3 positioning pins 15 are provided downwardly in an equidistantly spaced relationship by an angle of about 120 degrees in a circumferential direction on an annular or ring-shaped bottom wall of the light conducting member 13. The filter 11 is mounted in position relative to the light conducting member 13 and the support plate 5 by inserting the light conducting member 13 into the recess 6 of the support plate 5 and fitting the positioning pins 15 of the light conducting member 13 into the positioning holes 12 and 8 of the filter 11 and the support plate 5, respectively, The illuminating device further includes a knob 16 for manually operating an electric part such as a rotary switch. An operation shaft 17 is provided at the center of the knob 16. The knob 16 is located in the light conducting member 13 with the operating shaft 17 thereof fitted in the fitting hole 14 of the light conducting member 13 an the fitting hole 7 of the support plate 5 so that the knob 16 may rotate under the guidance of a guide face provided by an inner circumferential face of the light conducting member 13.

The illuminating device further includes an indication plate 19 pasted on an upper face of the support plate 5. The indication plate 19 constitutes an operation panel together with the support plate 5. The indication plate 19 has a circular opening 18 formed therein, and has a plurality of desired indicia or indicating marks 20 provided on a portion of the indication plate 19 around the opening 18. As shown in FIG. 3, an upper portion of the knob 16 and an upper end face of the light conducting member 13 are exposed outside at the opening 18 of the indication plate 19.

Now, operation of the illuminating device for an electric part having such a construction as described above will be described.

If the knob 16 which extends upwardly from the indicating plate 19 is manually rotated, the operation shaft 17 is rotated thereby. Consequently, the electric part of the manually rotatable type such as a rotary switch not shown which is connected to the lower end of the operation shaft 17 is operated to develop an output signal corresponding to a rotated position of the electric part, and the indication of the rotated position of the operation shaft 17 is observed from one of the indicia 20 corresponding to an index indicated on the knob 16. Thus, in the daytime, the position of the knob 16 is discerned by the light of the sun and the lamp 10 is not lit.

To the contrary, at night or when no sufficient external light is available, the lamp 10 will be lit. Thus, light from the lamp 10 is transmitted to the upper end face of the light conducting member 13 by way of the support plate 5 and the filter 11 to illuminate a circumferential area around the knob 16. In this instance, since the light absorbing portions 11*a* are formed in a large number of the circumferential half of the filter 11 opposing to the light source 10, the rate of light which passes through the circumferential half of the filter 11 on which the light absorbing portions 11*a* are formed is reduced comparing with the rate of light which passes through the other circumferential half of the filter 11 which only includes a light passing portion 11*b*. Consequently, the upper end face of the light conducting member 13 is illuminated with a substantially uniform brightness.

In the embodiment described above, since the positioning holes 12 are formed in the filter 11, the filter 11 can be positioned readily and with certainty if the positioning holes 12 are put into register with the positioning holes 8 of the support plate 5 and then the positioning pins 15 of the light conducting member 13 are inserted into the thus registered positioning holes 8 and 12. Accordingly, assembly of the illuminating device can be made readily.

Further, if the manner of distribution of the light absorbing portions 11*a* and the light passing portions 11*b* occupied in the filter 11 is suitably changed, for example, by changing the pitch or the width of the stripes on the light absorbing portions 11*a*, the rate of light which can pas through the filter 11 can be adjusted freely. Accordingly, the degree of freedom in designing is improved, and the overall size of the device can be reduced.

Having now fully described the invention, it will be apparent to one of ordinary skill in the art that many changes and modifications can be made thereto without departing from the spirit and scope of the invention as set forth herein.

What is claimed is:

1. An illuminating device for an electric part, comprising an operation panel, a knob mounted for manual rotation relative to said operation panel, a cylindrical light conducting member located around said knob, a light source located below said light conducting member, said light conducting member transmitting light emitted from said light source to an upper face of said operation panel, and an annular filter located on a lower face of said light conducting member and having thereon a positioning means for positioning said filter in a circumferential direction relative to said light conducting member, said filter having a light passing zone and a light absorbing zone formed at different circumferential portions thereof.

2. An illuminating device for an electric part according ot claim 1, wherein said light absorbing zone of said filter is opposed to said light source.

3. An illuminating device for an electric part according to claim 1, wherein each of said light passing zone and said light absorbing zone of said filter extends over about one half of the circumferential length of said annular filter.

4. An illuminating device for an electric part according to claim 1, wherein said light absorbing zone of said filter includes a large number of light absorbing stripes formed by printing with a color paint.

5. An illuminating device for an electric part according to claim 1, wherein said positioning means of said filter includes a positioning hole formed therein, and said light conducting member has a positioning pin formed thereon which extends through said positioning hole of said filter.

6. An illuminating device for an electric part according to claim 5, wherein said positioning means of said filter includes an additional positioning hole or holes formed therein, and said light conducting member has an additional positioning pin or pins formed thereon which extend through said additional positioning hole or holes of said filter, said positioning holes of said filter and said positioning pins of said light conducting member being formed in a same circumferentially spaced relationship.

7. An illuminating device for an electric part according to claim 5, wherein said positioning pin of said light conducting member extends also through a positioning hole formed in a support member on which said filter is mounted.

8. An illuminating device for an electric part according to claim 7, wherein said support member, said filter and said light conducting member are each made of a transparent or translucent material.

* * * * *